United States Patent [19]

Whittam

[11] 4,420,467

[45] Dec. 13, 1983

[54] ZEOLITE NU-5

[75] Inventor: Thomas V. Whittam, Darlington, England

[73] Assignee: Imperial Chemical Industries PLC, London, England

[21] Appl. No.: 331,832

[22] Filed: Dec. 17, 1981

[30] Foreign Application Priority Data

Dec. 17, 1980 [GB] United Kingdom ............... 8040395

[51] Int. Cl.$^3$ ..................... C01B 33/20; C01B 33/28; B01J 29/04

[52] U.S. Cl. ................................... 423/328; 423/277; 423/326; 423/329; 423/332; 502/61; 502/62

[58] Field of Search ...................... 423/277, 326–333; 252/432, 455 Z; 260/429 R, 438.5 R, 439 R, 448 R, 448 C; 556/400, 402

[56] References Cited

U.S. PATENT DOCUMENTS 3,702,886 11/1972 Argauer et al. ..................... 423/328
4,208,305 6/1980 Kouwenhoven et al. .......... 423/326
4,269,813 5/1981 Klotz .................................. 423/277
4,299,808 11/1981 Klotz .............................. 423/326 X
4,331,641 5/1982 Hinnenkamp et al. ............. 423/277
4,337,176 6/1982 Boersma et al. ................ 423/326 X

FOREIGN PATENT DOCUMENTS 2831631 7/1980 Fed. Rep. of Germany ...... 423/326

Primary Examiner—Edward J. Meros
Attorney, Agent, or Firm—Cushman, Darby & Cushman

[57] ABSTRACT

A synthetic zeolite material, designated zeolite Nu-5, having a molar composition expressed by the formula; 0.5 to 1.5 $R_2O$: $Y_2O_3$: at least 10 $XO_2$: 0 to 2000 $H_2O$ wherein R is a monovalent cation or 1/n of a cation of valency n, X is silicon and or germanium, Y is one or more of aluminium, iron, chromium, vanadium, molybdenum, arsenic, manganese, gallium or boron, and $H_2O$ is water of hydration additional to water notionally present when R is H, and having a defined X-ray diffraction pattern. Zeolite Nu-5 is a useful catalyst.

6 Claims, No Drawings

ZEOLITE NU-5

The present invention relates to a zeolite material, hereinafter referred to as zeolite Nu-5, to a method of making it and to processes using it as a catalyst.

According to the present invention we provide a synthetic zeolite material, designated zeolite Nu-5, having a molar composition expressed by the formula: 0.5 to $1.5R_2O:Y_2O_3$:at least $10XO_2$:0 to $2000H_2O$ wherein R is a monovalent cation or $1/n$ of a cation of valency n, X is silicon and or germanium, Y is one or more of aluminium, iron, chromium, vanadium, molydbenum, arsenic, manganese, gallium or boron, and $H_2O$ is water of hydration additional to water notionally present when R is H, and having an X-ray pattern substantially as set out in Table 1 (as determined by standard technique using copper $K\alpha$ radiation). Table 1 shows X-ray data for zeolite Nu-5. The X-ray pattern is little affected by the type of cation present or by calcination or hydration.

TABLE 1

X-ray diffraction data for Nu-5

| As-made Nu-5 Example 1 | | Hydrogen Nu-5 Example 3 | |
|---|---|---|---|
| dA | $100I/I_o$ | dA | $100I/I_o$ |
| 11.11 | 70 | 11.12 | 85 |
| 10.02 | 41 | 10.04 | 51 |
| 9.96 | 37 | 9.96 | 45 |
| 9.74 | 18 | 9.75 | 20 |
| 9.00 | 3 | 8.95 | 3 |
| 8.04 | 1 | 8.03 | 1 |
| 7.44 | 6 | 7.43 | 4 |
| 7.08 | 3 | 7.08 | 3 |
| 6.71 | 7 | 6.71 | 8 |
| 6.36 | 14 | 6.37 | 15 |
| 5.99 | 15 | 6.01 | 19 |
| 5.70 | 12 | | |
| 5.59 | 13 | 5.58 | 15 |
| 5.13 | 4 | 5.14 | 3 |
| 5.03 | 6 | 5.02 | 5 |
| 4.984 | 8 | 4.984 | 8 |
| 4.623 | 7 | 4.616 | 8 |
| 4.371 | 15 | 4.370 | 14 |
| 4.266 | 15 | 4.266 | 15 |
| 4.095 | 14 | 4.095 | 9 |
| 4.014 | 11 | 4.022 | 12 |
| 3.859 | 100 | 3.859 | 100 |
| 3.821 | 70 | 3.825 | 68 |
| 3.749 | 39 | 3.755 | 32 |
| 3.725 | 54 | 3.731 | 48 |
| 3.643 | 31 | 3.652 | 28 |
| 3.598 | 4 | 3.601 | 4 |
| 3.484 | 7 | 3.484 | 6 |
| 3.358 | 10 | 3.355 | 9 |
| 3.315 | 12 | 3.315 | 11 |
| 3.054 | 12 | 3.054 | 12 |
| 2.994 | 13 | 2.991 | 15 |
| 2.979 | 13 | 2.979 | 12 |
| 2.015 | 8 | 2.015 | 10 |
| 1.996 | 8 | 1.994 | 10 |

Within the above definition of chemical composition, the number of moles of $XO_2$ is typically in the range 10 to 5000 and zeolite Nu-5 appears to be most readily formed in a state of high purity when the number of moles of $XO_2$ is in the range 45 to 100.

This definition includes both freshly prepared zeolite Nu-5 ("freshly prepared" means the product of synthesis and washing, with optional drying, as hereinafter described) and also forms of its resulting from dehydration, and/or calcination, and/or ion exchange. In freshly prepared zeolite Nu-5, R may include an alkali metal cation, especially sodium, and/or ammonium and hydrogen, and usually includes organic compounds as described below. These organic components are hereinafter referred to as A.

Since Nu-5 is a zeolite, the organic component must be physically trapped within the crystal lattice. It can be removed by thermal or oxidative degradation or by displacement by suitable small molecules. This physically trapped material does not constitute part of the composition for the purposes of the definition. Thus a zeolite Nu-5 as made typically has the following molar composition: 0.7 to $1.5M_2O:1.0$ to $200A:Y_2O_3:10$ to $5000XO_2$:0 to $2000H_2O$ wherein M is an alkali metal, ammonium or hydrogen.

The $H_2O$ content of freshly prepared zeolite Nu-5 depends on the conditions in which it has been dried after synthesis.

In calcined forms of zeolite Nu-5, R may be any cation including hydrogen since the organic component is burnt out in the presence of air, leaving hydrogen as the other balancing cation, or otherwise displaced prior to calcination.

Among the ion-exchanged forms of zeolite Nu-5 the ammonium ($NH_4^+$) is of importance since it can be readily converted to the hydrogen form by calcination. The hydrogen form can also be prepared directly by exchange with an acid. The hydrogen-form and forms containing metals introduced by ion exchange are described further below.

While the X-ray data for as made and hydrogen Nu-5 show a strong similarity to data for ZSM5, there are very significant differences in line intensities in addition to extra lines present in Nu-5. These differences in line intensities are very substantial, and in scanning the spectrum of d-spaces, the intensity variations are very irregular, which suggests the differences between the framework of Nu-5 and ZSM5 is complex. The differences are best illustrated by reference to Tables 2 and 3. Table 2 compares X-ray diffraction data for an as made ZSM5, prepared as given in Example 5 of British Pat. No. 1,161,974 with data for as made Nu-5 of Example 1. There are marked differences in peak heights and intensities as clearly shown by the seventh column of Table 2, these variations correspond to differences of from 80% to 240% of the intensity, shown by a standard ZSM5. Similarly in Table 3 data for hydrogen Nu-5 is compared with data for Hydrogen ZSM5 and the differences are even greater when the intercalated organic compounds and sodium ions are removed. Thus for the hydrogen zeolites the variations in intensities for given diffraction peaks range from 40 to 280% of the standard HZSM5.

Further confirmation of differences between zeolite Nu-5 and ZSM5 comes from sorption behaviour. Table 4 gives sorption results which indicate that HNu-5 has a more constrained tunnel network than HZSM5 since both m-xylene and cyclohexane are not sorbed to a significant extent after 2 hours at $p/p_o = 0.5$ and 250° C.

TABLE 2

X-ray data as made Nu-5

| ZSM5 as made from Ex. 5 British Patent 1,161,974 | | | Nu-5 as made - Example 1 | | | Ratio Intensities Nu-5/ZSM5 |
|---|---|---|---|---|---|---|
| dA | Peak Height | $100I/I_o$ | dA | Peak Height | $100I/I_o$ | |
| 11.16 | 44 | 29 | 11.11 | 50 | 70 | 2.4 |
| — | — | — | 10.02 | 29 | 41 | — |
| 9.97 | 35 | 23 | 9.96 | 26 | 37 | 1.8 |

TABLE 2-continued

X-ray data as made Nu-5

| ZSM5 as made from Ex. 5 British Patent 1,161,974 | | | Nu-5 as made - Example 1 | | | Ratio Intensities Nu-5/ZSM5 |
|---|---|---|---|---|---|---|
| dA | Peak Height | 100$I/Io$ | dA | Peak Height | 100$I/Io$ | |
| 9.70 | 35 | 23 | 9.74 | 13 | 18 | 0.8 |
| 9.02 | 1 | 1 | 9.00 | 2 | 3 | 3 |
| — | — | — | 8.04 | 1 | 1 | — |
| 7.44 | 10 | 6.5 | 7.44 | 4 | 6 | 0.9 |
| 7.08 | 4.5 | 3 | 7.08 | 2 | 3 | 1.0 |
| 6.68 | 4.5 | 3 | 6.71 | 5 | 7 | 2.3 |
| 6.35 | 12 | 8 | 6.36 | 10 | 14 | 1.8 |
| 6.04 | 10.5 | 7 | 5.99 | 10.5 | 15 | 2.1 |
| 5.72 | 9 | 6 | 5.70 | 8.5 | 12 | 2.0 |
| 5.56 | 12 | 8 | 5.59 | 9.5 | 13 | 1.6 |
| 5.37 | 6 | 4 | 5.37 | 4 | 6 | 1.5 |
| 5.13 | 3 | 2 | 5.13 | 3 | 4 | 2.0 |
| — | — | — | 5.03 | 4 | 6 | — |
| 4.997 | 6 | 4 | 4.984 | 5.5 | 8 | 2.0 |
| 4.601 | 9 | 6 | 4.623 | 5 | 7 | 0.8 |
| 4.355 | 10 | 6.5 | 4.371 | 10.5 | 15 | 2.3 |
| 4.259 | 12 | 8 | 4.266 | 11 | 15 | 1.9 |
| 4.077 | 2 | 1.5 | 4.095 | 10 | 14 | 9.0 |
| 3.999 | 10 | 6.5 | 4.014 | 8 | 11 | 1.7 |
| 3.837 | 150 | 100 | 3.859 | 71 | 100 | 1.0 |
| 3.818 | 80 | 53 | 3.821 | 50 | 70 | 1.3 |
| 3.749 | 56 | 37 | 3.749 | 28 | 39 | 1.05 |
| 3.716 | 66 | 44 | 3.725 | 38 | 54 | 1.2 |
| 3.646 | 47 | 31 | 3.643 | 22 | 31 | 1.0 |
| — | — | — | 3.598 | 3 | 4 | — |
| 3.437 | 11 | 7 | 3.484 | 5 | 7 | 1.0 |
| — | 7.5 | 5 | 3.450 | 6 | 10 | — |
| — | — | — | 3.358 | 7 | 10 | — |
| 3.333 | — | — | 3.315 | 8.5 | 12 | 2.0 |

TABLE 3

X-ray data for calcined hydrogen Nu-5 and ZSM5

| Calcined HZSM5 | | | Calcined HNu-5 | | | Ratio Intensities Nu-5/ZSM5 |
|---|---|---|---|---|---|---|
| dA | Peak Height | 100$I/Io$ | dA | Peak Height | 100$I/Io$ | |
| 11.12 | 98 | 100 | 11.12 | 55 | 85 | 0.9 |
| — | — | — | 10.04 | 33 | 51 | — |
| 9.96 | 54 | 55 | 9.96 | 29 | 45 | 0.8 |
| 9.74 | 46 | 47 | 9.75 | 13 | 20 | 0.4 |
| 8.99 | 1 | 1 | 8.95 | 2 | 3 | 3.0 |
| — | — | — | 8.03 | 1 | 1 | — |
| 7.44 | 10 | 6.5 | 7.43 | 2.5 | 4 | 0.3 |
| 7.0 | 5 | 5 | 7.08 | 2 | 3 | 0.6 |
| 6.70 | 8 | 8 | 6.71 | 5.5 | 8 | 1.0 |
| 6.36 | 12 | 12 | 6.37 | 10 | 15 | 1.3 |
| 6.02 | 18 | 18 | 6.01 | 12.5 | 19 | 1.1 |
| 5.57 | 13 | 13 | 5.58 | 10 | 15 | 1.2 |
| 5.37 | 5 | 5 | 5.37 | 3 | 5 | 1.0 |
| 5.15 | 2 | 2 | 5.14 | 2 | 3 | 1.5 |
| — | — | — | 5.02 | 3.5 | 5 | — |
| 4.994 | 4 | 4 | 4.984 | 5 | 8 | 2.0 |
| 4.603 | 7 | 7 | 4.616 | 5 | 8 | 1.1 |
| 4.358 | 5 | 5 | 4.370 | 9 | 14 | 2.8 |
| 4.262 | 9 | 9 | 4.266 | 10 | 15 | 1.7 |
| — | — | — | 4.095 | 9 | 14 | — |
| 4.002 | 6 | 6 | 4.022 | 8 | 12 | 2.0 |
| 3.842 | 94 | 96 | 3.859 | 65 | 100 | 1.0 |
| 3.822 | 45 | 46 | 3.825 | 44 | 68 | 1.5 |
| 3.752 | 42 | 43 | 3.755 | 21 | 32 | 0.7 |
| — | — | — | 3.731 | 31.5 | 48 | — |
| 3.649 | 15 | 15 | 3.652 | 18 | 28 | 1.9 |
| — | — | — | 3.601 | 2.5 | 4 | — |
| — | — | — | 3.484 | 4 | 6 | — |
| 3.442 | 8 | 6 | 3.456 | 6 | 9 | 1.5 |
| 3.336 | 6 | 6 | 3.355 | 6 | 9 | — |
| — | — | — | 3.315 | 7 | 11 | — |

TABLE 4

| Zeolite | n-hexane | p-xylene | m-xylene | cyclohexane |
|---|---|---|---|---|
| HNu-5 | 9.0 | 8.0 | 0.1 | 0.1 |
| HZSM5 | 9.6 | 9.5 | 7.1 | 3.0 |

Zeolite Nu-5 has molecular sieve properties analogous to those of known zeolites. Thus zeolite Nu-5 may be characterised by its adsorption capacity for molecules of various sizes. Negligible sorption of cyclohexane and m-xylene and rapid sorption of p-xylene suggest an entry port size of about 6.0 A in diameter. The results indicate that zeolite Nu-5 may be used to separate xylene isomers. By comparison with ZSM5 zeolite, Nu-5 should be more effective in separating xylene isomers.

The invention provides also a method of making zeolite Nu-5 which comprises reacting an aqueous mixture comprising at least one oxide $XO_2$, at least one oxide $Y_2O_3$ and at least one compound selected from pentaerythritol, dipentaerythritol and tripentaerythritol.

The reaction mixture preferably has the following molar composition:

| $XO_2/Y_2O_3$ | 10 to 5000 | preferably 50 to 200 |
| $MOH/XO_2$ | 0.01 to 0.5 | preferably 0.10 to 0.25 |
| $Z^-/Y_2O_3$ | 0 to 5000 | preferably 10 to 100 |
| $A/Y_2O_3$ | 1 to 200 | preferably 1 to 50 |
| $H_2O/XO_2$ | 10 to 500 | preferably 15 to 300 | where X is silicon and/or germanium, Y is one or more of aluminium, gallium, iron, chromium, vanadium, molybdenum, arsenic, manganese or boron, M is an alkali metal or ammonium, and A is the aforesaid pentaerythritol compound. $Z^-$ is a strong acid radical present as a salt of M and may be added as a free acid to reduce the free $OH^-$ level to a desired value. M can be present as hydroxides or salts of inorganic or organic acids provided the $MOH/XO_2$ requirement is fulfilled.

The preferred pentaerythritol compound is pentaerythritol, and the preferred acid radical is sulphate.

The preferred alkali metal (M) is sodium. The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered solid silica, silicic acid, colloidal silica or dissolved silica. Among the powdered silicas usable are precipitated silicas, especially those made by precipitation from an alkali metal silicate solution, such as the type known as "KS 300" made by AKZO, and similar products, aerosil silicas, fume silicas and silica gels suitably in grades for use in reinforcing pigments for rubber or silicone rubber. Colloidal silicas of various particle sizes may be used, for example 10-15 or 40-50 microns, as sold under the Registered Trade Marks "LUDOX" "NALCOAG" and "SYTON". The usable dissolved silicas include commercially available waterglass silicates containing 0.5 to 6.0, especially 2.0 to 4.0 mols of $SiO_2$ per mol of alkali metal oxide, "active" alkali metal silicates as defined in U.K. Pat. No. 1,193,254, and silicates made by dissolving silica in an alkali metal hydroxide or quaternary ammonium hydroxide or a mixture thereof. The preferred silica source is waterglass.

The alumina source is most conveniently sodium aluminate, but can be or can include aluminium, an aluminium salt for example the chloride, nitrate or sulphate, an aluminium alkoxide or alumina itself, which should preferably be a hydratable form such as colloidal alumina, pseudoboehmite, boehmite, gamma alumina or the alpha or beta trihydrate.

The reaction mixture is reacted usually under autogenous pressure, optionally with added gas, e.g. nitrogen at a temperature between 85° and 250° C. until crystals of zeolite Nu-5 form, which can be from 1 hour to many months depending on the reactant composition and the operating temperature. Agitation is optional, but is preferable since it reduces the reaction time.

At the end of the reaction, the solid phase is collected on a filter and washed and is then ready for further steps such as drying, dehydration and ion-exchange.

If the product of the reaction contains alkali metal ions, these have to be at least partly removed in order to prepare the hydrogen form of Nu-5 and this can be done by ion exchange with an acid, especially a strong mineral acid such as hydrochloric acid or by way of the ammonium compound, made by ion exchange with a solution of an ammonium salt such as ammonium chloride. Such ion exchange can be carried out by slurrying once or several times with the solution.

In general, the cation(s) of zeolite Nu-5 can be replaced by any cation(s) of metals, and particularly those in Groups IA, IB, IIA, IIB, III (including rare earths) VIII (including noble metals) and by lead, tin and bismuth. (The Periodic Table is as in "Abridgements of Specifications" published by the UK Patent Office). Exchange is carried out using any water soluble salts containing the appropriate cation.

In order to prepare a catalyst, zeolite Nu-5 may be used in association with an inorganic matrix, or with other materials which can be either inert or catalytically active. The matrix may be present simply as a binding agent to hold the small zeolite particles (0.005 to 10 microns) together, or it may be added as a diluent to control the amount of conversion in a process which may otherwise proceed at too high a rate, leading to catalyst fouling as a result of excessive coke formation. Typical inorganic diluents include catalyst support materials such as alumina, silica, kaolinic clays, bentonites, montmorillonites, sepiolite, attapulgite, Fullers earth, synthetic porous materials such as $SiO_2$-$Al_2O_3$, $SiO_2$-$ZrO_2$, $SiO_2$-$ThO_2$, $SiO_2$-$BeO$, $SiO_2$-$TiO_2$ or any combination of these oxides. An effective way of mixing zeolite Nu-5 with such diluents is to mix appropriate aqueous slurries in a mixing nozzle and then to spray-dry the slurry. Other ways of mixing can be used.

If zeolite Nu-5 in any cationic form or as a catalytic composite is exchanged or impregnated with hydrogenation/dehydrogenation components, such as Ni, Co, Pt, Pd, Re, Rh, hydrocracking and reforming catalysts can be made, especially if the $Na_2O$ content is less than 0.1% w/w.

A wide range of hydrocarbon conversion catalysts can be prepared from zeolite Nu-5 by ion exchange or impregnation with cations, or oxides, selected from the following Cu, Ag, Mg, Ca, Sr, Zn, Cd, B, Al, Sn, Pb, V, P, Sb, Cr, Mo, W, Mn, Re, Fe, Co, Ni, noble metals and lanthanides.

Usually the Nu-5 catalyst will be in acid form, thus stoichiometry is maintained by $H^+$ or $H_3O^+$ as an additional balancing cation, or as sole cation. Such catalysts may find application in the following processes; catalytic cracking, hydrodesulphurization, hydrodenitrification, catalytic dewaxing, alkylation of alkanes or aromatics, dealkylation, disproportionation, isomerisation of alkanes and alkyl benzenes, dehydration reactions, oxidation and polymerisation.

We have found that zeolite Nu-5 is especially useful as a catalyst for xylenes isomerisation. As is well known, the major aim in xylenes isomerisation is to increase the para-xylenes content of the feedstock at the expense of the other isomers since para-xylene is a particularly useful and valuable product. The mixed xylenes feedstocks commonly available for xylenes isomerisation usually contain amounts of the three xylene isomers as well as ethylbenzene. Hitherto, some of the mixed xylenes feedstock available has contained relatively small amounts of ethylbenzene but it is anticipated that in the future such feedstocks will become more expensive and that resort will have to be made to feedstocks containing rather larger amounts of ethylbenzene, say up to about 25% ethylbenzene.

We have also found that zeolite Nu-5 has exceptional selectivity for production of p-xylene from toluene.

In our copending UK Applications we disclose the use of Nu-5 as a catalyst in xylenes isomerisation (8040398) and in toluene disproportionation, toluene methylation and methanol conversion to olefins and aromatics (8040396).

Zeolite Nu5 may also find applications in the separation of aromatic and cycloparaffins and in pollution control by its ability to remove organic contaminants from aqueous effluents.

The invention is illustrated by the following Examples.

EXAMPLE 1

Preparation of sodium pentaerythritol Nu-5. The synthesis mixture had the following molar composition: $23.9Na_2O$, $20A$, $Al_2O_3$, $89SiO_2$, $3600H_2O$, $15.9SO_4^{2-}$ 30 g pentaetythritol were dispersed in 189 g Q.79 water-glass ($Na_2O$, $0.01Al_2O_3$, $3.77SiO_2$, $24H_2O$) and 300 g water. Next a solution of 5.3 g aluminium sulphate ($Al_2O_3$, $3SO_3$, $16H_2O$) and 14.8 g 98% sulphuric acid in 304 g water were added with vigorous stirring. The resulting slurry was reacted for 48 hours at 180° C. in a stirred stainless steel, 1 liter autoclave, under autogenous pressure. After cooling to 60° C., the slurry was filtered and washed with two liters of distilled water, and dried overnight at 120° C. The product was sodium pentaerythritol Nu-5 having the X-ray diffraction data given in Table 1, and a molar composition: $0.31Na_2O$, $4.7A$, $Al_2O_3$ $68SiO_2$, $24.6H_2O$

EXAMPLE 2

The bulk of the product of Example 1 was calcined in moist air at 550° C. for 17 hours. While the X-ray diffraction peaks were shifted only marginally, the net effect was a 10% increase in diffraction peak heights at high d-spacings i.e. around 10 to 11A and a 10% decrease for peaks around 4A d-spacings.

EXAMPLE 3

Preparation of hydrogen Nu-5. The calcined product of Example 2, was slurried at 60° C. for 1 hour with 4 ml of 2 N.hydrochloric acid per g of zeolite. The resulting form of Nu-5 was washed with 10 ml per g of distilled water, dried overnight, and activated for sorption and catalysis testing at 450° C. for six hours. Its composition was $0.07Na_2O$, $Al_2O_3$, $70SiO_2$ i.e. 7% of the cation sites were occupied by sodium ions, the remainder by hydrogen ions.

EXAMPLE 4

In a further preparation of zeolite Nu-5 the synthesis mixture molar composition was: $4Na_2O$, $10A$, $Al_2O_3$, $85.6SiO_2$, $1800H_2O$, $40NaCl$ 3.5 g sodium aluminate ($1.25Na_2O$, $Al_2O_3$, $3H_2O$) and 2.2 g sodium hydroxide were dissolved in 150 g water. Next 21 g of pentaerythritol were stirred in, followed by 271 g colloidal silica (Syton X-30) ($Na_2O$, $0.0395Al_2O_3$, $85.6SiO_2$, $689H_2O$). Finally 36 g sodium chloride dissolved in 156 g water were added with stirring. The slurry was reacted for 24 hours in a stirred stainless steel autoclave at 180° C. The product was filtered, washed and dried as in Example 1 and had identical X-ray diffraction data. Its composition was $0.5Na_2O$, $3A$, $Al_2O_3$, $45SiO_2$, $15H_2O$.

EXAMPLE 5

This example demonstrates that $MOH/SiO_2$ can be a critical parameter in the synthesis of zeolite Nu-5. The reaction mixture had the following molar composition. $29.75Na_2O$, $24.3A$, $Al_2O_3$, $96SiO_2$, $4440H_2O$, $16.95SO_4^=$. The reaction mixture was as in Example 1, except that 189 g of a different waterglass of composition ($Na_2O$, $0.0025Al_2O_3$, $3.2SiO_2$, $24.3H_2O$) was used. This gave an $MOH/SiO_2$ of 0.27 whereas in Example 1 the ratio was 0.18. The increased alkalinity in this Example caused the formation of a substantial level of α-cristobolite (about 35%w) as impurity along with the zeolite Nu-5.

EXAMPLE 6

This example was as Example 1, except that 20 g sulphuric acid were used instead of 14.8 g. This gave an $MOH/SiO_2$ of 0.07 instead of 0.18. The reduced alkalinity caused the formation of about 30%w tridymite as impurity in the zeolite Nu-5 product.

EXAMPLES 7 TO 10

In these examples, additional compounds were added to Example 1 type reaction mixtures and the reaction time at 180° C. was increased from 48 to 96 hours. All of the additives were dissolved in the acidic solution, except the antimonious oxide, which was dispersed in the final reaction mixture. In each example the product was zeolite Nu-5.

In Example 7, the additive was 5 g of potassium chrome alum, and the dried product contained 0.5%w $Cr_2O_3$.

In Example 8, the additive was 3 g of boric acid and the product contained 0.4%w $B_2O_3$.

In Example 9, the additive was 6.5 g of disodium hydrogen phosphate and the Nu-5 product contained 0.8%w P.

In Example 10, the additive was 3 g antimonious oxide and the product contained 4.1%w $Sb_2O_3$.

EXAMPLE 11

The synthesis mixture had the following molar composition $8.1K_2O$, $20A$, $Al_2O_3$, $89SiO_2$, $3600H_2O$, $15.9K_2SO_4$. First, 1.6 g pseudoboehmite ($Al_2O_3$, $3H_2O$) were dissolved in a solution of 9.2 g potassium hydroxide in 30 g water. Next, the aluminate was stirred into a dispersion of 54 g Aerosil 200 in 27.5 g pentaerythritol and 320 g water. Finally, 28 g potassium sulphate in 300 g water were stirred into the slurry. The mixture was reacted for 96 hours at 80° C. and the procedure was then as in Example 1. The product was potassium Nu-5.

EXAMPLE 12

This example was as Example 11 except that 9.2 g potassium hydroxide were replaced by 16.8 g rubidium hydroxide, and 28 g potassium sulphate by 43 g of rubidium sulphate, and the reaction was 120 hours at 180° C. The product was rubidium Nu-5.

What we claim is:

1. A synthetic zeolite material having a molar composition expressed by the formula: 0.5 to $1.5R_2O:Y_2O_3$:45 to $100XO_2$:0 to $2000H_2O$ wherein R is a monovalent cation or 1/n of a cation of valency n, X is silicon or germanium, Y is aluminium, and $H_2O$ is water of hydration additional to water notionally present when R is H, and having an X-ray diffraction pattern as set out in Table 1.

2. A synthetic zeolite material having a molar composition expressed by the formula: 0.5 to $1.5R_2O:Y_2O_3$:45 to $100XO_2$:0 to $2000H_2O$ wherein R is a monovalent cation or 1/n of a cation of valency n, X is silicon and or germanium, Y is aluminum and one or more of iron, chromium, arsenic, manganese, gallium or boron, and $H_2O$ is water of hydration additional to water notionally present when R is H, and having an X-ray diffraction pattern as set out in Table 1.

3. A synthetic zeolite material according to claim 1 or claim 2 having, as freshly made, a molar composition expressed by the formula: 0.7 to $1.5M_2O$:1.0 to $200A:Y_2O_3$:45–$100XO_2$:0 to $2000H_2O$ wherein M is an alkali metal, ammonium or hydrogen and A is pentaerythritol, dipentaerythritol or tripentaerythritol.

4. A synthetic zeolite material according to claim 1 or claim 2 wherein R is or includes hydrogen.

5. A method of making a synthetic zeolite material as defined in claim 3 which comprises reacting an aqueous mixture comprising at least one oxide $XO_2$, at least one oxide $Y_2O_3$, at least one source of M and at least one compound selected from pentaerythritol, depentaerythritol and tripentaerythritol and wherein the aqueous mixture has the molar composition:

$XO_2/Y_2O_3$—50 to 200
$MOH/XO_2$—0.10 to 0.25
$Z^-/Y_2O_3$—10 to 100
$A/Y_2O_3$—1 to 50
$H_2O/XO_2$—15 to 300 wherein A is pentaerythritol, dipentaerythritol or tripentaerythritol, M is an alkali metal or ammonium and $Z^-$ is a strong acid radical.

6. A catalyst comprising a synthetic zeolite material as claimed in claim 1 or 2.

* * * * *

UNITED STATES PATENT AND TRADEMARK OFFICE
CERTIFICATE OF CORRECTION

PATENT NO. : 4,420,467
DATED : December 13, 1983
INVENTOR(S) : Thomas V. Whittam It is certified that error appears in the above-identified patent and that said Letters Patent is hereby corrected as shown below:

Column 2, line 57, substitute --25°C-- for "250°C".

Signed and Sealed this

Twenty-third Day of October 1984

[SEAL]

Attest:

GERALD J. MOSSINGHOFF

Attesting Officer

Commissioner of Patents and Trademarks